United States Patent Office 3,169,850
Patented Feb. 16, 1965

3,169,850
SYNERGISTIC HERBICIDAL COMPOSITION
Jack T. Thompson, 1123 George Circle, Griffin, Ga.
No Drawing. Filed Jan. 15, 1962, Ser. No. 166,401
2 Claims. (Cl. 71—2.6)

This invention relates to new herbicides comprising synergistic mixtures of two known herbicides and to methods of controlling weeds with these mixtures.

Rather good results have been obtained using N-(3,4-dichlorophenyl)methacrylamide (sold under the name Dicryl) as a post-emergent herbicide for use in cotton, certain grass species and a number of food crops, in particular, corn and carrots. The herbicide is particularly effective with broadleaf weeds, but somewhat less effective with grasses, particularly at low concentrations. Moreover, optimum results are obtainable only by careful timing of the application with respect to the age of the weed on which it is being used. Moreover, the action of the herbicide on multiple applications is not additive, so that if control is not obtained with a single application, that application is wasted.

Another herbicide which has been suggested for use with grassy weeds is disodium methyl arsonate (known as DMA). It has very marked shortcomings, particularly, it has a very limited range of broadleaf weed control, a very short residual life, it requires rather high temperatures for activity, 70 to 75° F., the timing of application is critical and it is phytotoxic to cotton at the levels necessary for weed control.

I have discovered the Dicryl and DMA form synergistic mixtures when used in combinations containing from about 5 parts of Dicryl to 1 part of DMA, to about 1 part of Dicryl to 5 parts of DMA. These synergistic mixtures overcome most of the disadvantages of each of the products. They markedly reduce the criticality of timing which is one of the marked disadvantages of both herbicides when used alone, give effective weed control at rates of application substantially below those at which either compound alone is really effective, and yield excellent additive results on multiple applications.

Dicryl, N-(3,4-dichlorophenyl)methacrylamide, may be prepared by the reaction of 3,4-dichloroaniline with methacrylyl chloride in the presence of a tertiary amine—for example, as follows:

To a stirred solution of 17.8 g. (0.11 mole) of 3,4-dichloroaniline and 10.1 g. (0.1 mole) of triethylamine in 200 ml. of benzene was added dropwise 10.5 g. (0.01 mole) of freshly distilled methacrylyl chloride. The mixture was heated under reflux for one hour with stirring, then allowed to cool to room temperature. To the cooled mixture was added 100 ml. of 1% hydrochloric acid and stirring was continued for 0.5 hour. The benzene layer was separated and the aqueous phase was extracted twice with 50 ml. portions of ether. The combined benzene and ether solutions were washed with 100 ml. of water, separated and dried over anhydrous potassium carbonate. The solvent was removed by distillation to give 18.5 g. (76%) of solid product which melted at 123–125° C. Recrystallization from ligroin-ethanol gave a solid which melted at 124–126° C.

*Analysis.*—Calcd. $C_{10}H_9Cl_2NO$: C, 52.20; H, 3.94. Found: C, 52.02; H, 3.67.

Disodium methyl arsonate may be prepared by the reaction of methyl chloride with sodium arsonate under pressure as described in the Miller et al. Patent 2,442,372, issued June 1, 1948, or by the reaction of dimethyl sulfate with a solution of arsenic trioxide in sodium hydroxide according to the procedure of Schwerdle Patent 2,889,347, issued June 2, 1959. The DMA of commerce varies in active ingredient from about 50 to 75%, whereas the Dicryl of commerce is substantially all active material. Concentrations indicated in the discussion and specific examples relate to active ingredient in each case.

The Dicryl and DMA mixtures may be prepared in advance, or just prior to use. The Dicryl may be absorbed into powdery carriers in the presence of a surfactant, to form a wettable powder which is mixed with water and sprayed onto the area to be treated, or it may be blended with solvents and surfactants to form liquid emulsifiable concentrates; the DMA is readily dispersible in water as is, so that it may be blended with the emulsifiable concentrate or the wettable powder or Dicryl, and added water, to give the desired syngergistic mixture.

When the Dicryl is to be employed as an emulsifiable formulation, the following formulations have been found to be satisfactory.

Formulation I: Percent
  Dicryl _____ 20.0
  Isophorone _____ 40.0
  Xylene _____ 35.0
  Surfactant (blend of polyoxyethylene ethers and
    oil soluble sulfonates, such as Emcol H–88) _ 5.0
Formulation II:
  Dicryl _____ 26.0
  Xylene _____ 64.0
  Surfactant (alkylaryl polyether alcohol, such as
    Agrimul 70–A) _____ 10.0

When the Dicryl is to be employed as a wettable powder, the following formulations have been found to be satisfactory.

Formulation III: Percent
  Dicryl _____ 50.0
  Kaolin _____ 47.7
  Glycerol mannitan laurate _____ 1.0
  Sodium lignosulfonate _____ 1.0
  Sulfonated aliphatic polyesters _____ 0.3
Formulation IV:
  Dicryl _____ 50.0
  Kaolin _____ 48.0
  Sodium lignosulfonate _____ 1.0
  Sodium lauryl sulfate _____ 1.0

The active ingredients, formulated as above indicated, are generally diluted with water so that the finished material, when applied at a rate of the order of 20 to 100 gallons per acre, will give the desired concentration of ingreditents. In most tests, 40 gallons per acre were used. This value can of course be adjusted as desired to fit the equipment used, but represents a fair average of commercial usage in the field.

As illustrative of the improved results which can be obtained with the synergistic mivtures of this invention, the following examples are given by way of illustration, and not by way of limitation.

EXAMPLE 1

*Bermuda grass*

DMA has been recommended for the control of weeds in hot weather grasses such as Bermuda grass. Such control can be obtained with certain weeds, and under some conditions, but there is always the necessity for careful balance between getting enough on to kill the weeds, while avoiding the use of so much as to damage the grass unduly.

For example, in a test run on established experimental turfs of fine leaf Bermuda grass, it was observed that 5 pounds per acre of DMA failed to control the weeds effectively, while 10 pounds damaged the grass; with newer lawns and newer weeds, the 5 pound treatment was effective. As compared with this, effective control was obtained in newer lawns with mixtures of 0.5 pound Dicryl and 1.0 pound DMA per acre, in more established lawns with larger weeds, at both 0.75 pound and 1.0 pound Dicryl, with either 2.0 or 3.0 pounds DMA per acre. Particularly noteworthy is the fact that where insufficient quantities of mixture were used, a second application—to equal the total rate indicated above—gave control by the additive effect of the two sprays.

In this test, the emulsifiable concentrate of Formulation I was used as the source of Dicryl; the material was diluted to give a 40 gallon per acre application rate.

EXAMPLE 2

Tests on cotton

It is particularly with cotton that the synergistic mixtures of this invention are the most useful.

The DMA was added slowly with agitation to the water to secure proper dissolution. The Dicryl employed was the stock solution of Formulation I. The experiment was in randomized blocks with 4 single, 25 foot row replicates. In the first experiment, mixtures of Dicryl and DMA were applied to cotton in two stages of development. The weeds were mainly crabgrass 2 to 6 inches tall and morning glory 2 to 5 inches tall with a fair sprinkling of goosegrass and Brachiaria. The blocks were treated by semi-directed spray to minimize effect on the cotton. The results are shown in the following table; weed control estimates were made 11 days after treatment.

TABLE I.—DICRYL-DMA WEED CONTROL EXPERIMENT

| Treatment (Lbs. active/acre broadcast) | Percent Weed Control | |
|---|---|---|
| | Block I | Block II |
| Dicryl 0.5+DMA 1.5 | 65 | 43 |
| Dicryl 0.75+DMA 1.5 | 77 | 68 |
| Dicryl 1.0+DMA 1.5 | 85 | 75 |
| Dicryl 1.0+DMA 1.0 | 67 | 43 |
| Dicryl 1.0+DMA 2.0 | 87 | 83 |
| Dicryl 1.0+DMA 3.0 | 96 | 96 |
| Dicryl 3.0 | 65 | 33 |

Block I treated, grass 1–4″; cotton 2 leaf stage.
Block II treated, grass 2–5″ well tillered; cotton 3–4 leaf stage.

Weed weights were taken on a number of the experimental patches 114 days after treatment. The weeds were cut down and weighed green. The following results were obtained:

TABLE II

| Treatment (Lbs. active/acre broadcast) | Block I | | Block II | |
|---|---|---|---|---|
| | Percent Weed Control | Green Weed Wt. (lb.) | Percent Weed Control | Green Weed Wt. (lb.) |
| Dicryl 1.0+DMA 2.0 | 87 | 0.8 | 83 | 0.6 |
| Dicryl 1.0+DMA 3.0 | 96 | 0.8 | 96 | 0.2 |
| Dicryl 3.0 | 65 | 2.5 | 33 | 6.2 |
| Untreated | 0 | 6.2 | 0 | 6.5 |

EXAMPLE 3

To demonstrate the synergistic effect of the combination, randomized blocks were used with 4 single, 100 foot row replicates. In Block I, two flushes of weeds were present, the first 1 to 6 inches in height and the second consisting of grass ½ inch to 1 inch tall. In Block II the weeds were approximately 20 days old and ranged up to 12 inches in height. The main grasses present were crabgrass, with some goosegrass and Brachiaria; morning glory and cocklebur were the main broadleaf weeds present. The results are shown in the following table; control estimated 10 days after treatment.

TABLE III

| Treatment (Lbs. active/acre broadcast) | Percent Weed Control | |
|---|---|---|
| | Block I | Block II |
| Dicryl 1.0+DMA 1.5 | 69 | 40 |
| Dicryl 1.0+DMA 2.0 | 75 | 60 |
| Dicryl 1.0+DMA 3.0 | 91 | 83 |
| Dicryl 0.75+DMA 2.0 | 74 | 58 |
| Dicryl 3.0 | 62 | 42 |
| Dicryl 1.0 | 18 | 20 |
| DMA 3.0 | 20 | 7 |
| Untreated | 0 | 0 |

Note that in Block I, little control is obtained with 3.0 pounds DMA per acre, fair control with 3.0 Dicryl, but that good control is obtained with a combination of 3.0 pounds DMA with 1.0 pound of Dicryl. On the older weeds, the synergism is even more marked.

EXAMPLE 4

A test was run similar to that of Example 3 but restricted to only three treatments. There were four single row replicates, each row 40 feet long for each of the experiments. Crabgrass was the main weed, size ½ to 6 inches tall. The weed ratings and hoe time were taken 12 and 13 days after treatment and the treatment itself was 16 days after planting.

TABLE IV

| Treatment and Rate | Percent Weed Control | Hoe Time, Hours/Acre |
|---|---|---|
| Dicryl, 1 lb. +DMA, 3 lbs | 92 | 7.3 |
| Dicryl, 1 lb | 11 | 14.8 |
| DMA, 3 lbs | 25 | 15.7 |
| Check | 0 | 19.0 |

Data are expressed as the average of 4 replicates.

EXAMPLE 5

Split application

As indicative of the results obtainable from a split application, a stand of cotton very similar to that of Example 2 was used. In one case all of the spray containing ¾ of a pound of Dicryl and 1½ pounds of DMA per acre was applied when the cotton was 11 days old. In the other case, half of the material was applied at this time and the second half 8 days later. Weed control is shown in the following table:

TABLE V

| Treatment | Percent Weed Control | | | | |
|---|---|---|---|---|---|
| | Rep. 1 | Rep. 2 | Rep. 3 | Rep. 4 | Average |
| One application | 90 | 95 | 95 | 90 | 93 |
| Split application | | 90 | 95 | 95 | 93 |

The tests have indicated that the synergistic mixture of this invention is useful to control weeds in crops other than cotton, and turfs; for example, it has been determined that such crops as Hawkeye soya beans and bell peppers can be treated with these herbicides without damage to the crops.

Since the herbicides seem to act by contact with the plant, the activity of the materials applied can be varied by changing the surfactant used. In general, the amount of herbicide necessary for any given result will be reduced as the activity of the surfactant increases, whereby the toxicant is spread over a greater surface of the plant. At the same time, of course, any effect on the crop itself is increased. Any surfactant, anionic, cationic or nonanionic which will act to make the Dicryl miscible and sprayable in aqueous emulsions can be used, bearing in mind the above effect of the activity of the surfactant in considering dosage requirements.

As indicated above the ratios of the two ingredients may be varied from 5 to 1 of Dicryl to DMA to 1 to 5 of Dicryl to DMA. The total amount of the toxicant used may vary within wide limits. Since the effect of multiple applications is additive, very small quantities of the mixtures can be used in a single application, although in general, about at least ½ pound of each material per acre should be used. In general, because of economic considerations, not more than 3 pounds per acre of each of the ingredients should be used. However, these maximums can be exceeded under special conditions, provided the crops are protected from contact with the toxicant.

It is obvious that changes can be made in the examples shown without departing from the scope of the present invention outlined in the following claims.

What is claimed is:

1. An herbicidal composition comprising a mixture of N-(3,4-dichlorophenyl)methacrylamide and disodium methyl arsonate in a weight ratio of between 5 parts of N-(3,4-dichlorophenyl)methacrylamide per part of disodium methyl arsonate, and 1 part of N-(3,4-dichlorophenyl)methacrylamide per 5 parts of disodium methyl arsonate, in total amount sufficient to form an effective herbicidal composition, a surfactant and a carrier.

2. The method of selectively controlling and inhibiting undesirable plant growth which comprises applying to the undesirable plant growth in toxic concentrations a synergistic mixture of N-(3,4-dichlorophenyl)methacrylamide and disodium methyl arsonate in a weight ratio of between 5 parts of N-(3,4-dichlorophenyl)methacrylamide per part of disodium methyl arsonate, and 1 part of N-(3,4-dichlorophenyl)methacrylamide per 5 parts of disodium methyl arsonate.

References Cited in the file of this patent

UNITED STATES PATENTS

| | | |
|---|---|---|
| 2,678,265 | Schwerdle | May 11, 1954 |
| 3,035,910 | Boyack | May 22, 1962 |
| 3,108,038 | Fielding et al. | Oct. 22, 1963 |

FOREIGN PATENTS

| | | |
|---|---|---|
| 1,116,469 | Germany | Nov. 2, 1961 |

OTHER REFERENCES

Fertig: "Proceedings of the Northeastern Weed Control Conference," Jan. 4, 5, 6, 1961, pages 23–28.